3,395,086
REMOVAL OF MOISTURE FROM ORGANIC LIQUID SOLVENT

Irving Victor, Minneapolis, Minn., assignor to Research Development Co., Minneapolis, Minn., a partnership
No Drawing. Filed Sept. 11, 1963, Ser. No. 308,093
3 Claims. (Cl. 203—14)

This invention relates to improvements in the separation and removal of water or combined moisture from a solvent used for the cleansing or cleaning of materials. More particularly, the invention is concerned with the mode of treatment of a chloro-fluorohydrocarbon used for cleaning or cleansing purposes which is mixed with water or has moisture entrained therein so as to cause the entrained moisture to be coalesced into larger agglomerates, and then separate the two liquids so that the solvent is available for re-use in a relatively moisture-free condition.

In the processes of cleansing materials with organic solvents, either in the use thereof, or the recovery of such solvent for re-use, it may become mixed or combined with water to such an extent that some of the moisture may be tenaciously entrained in the solvent and requires separation before the solvent can be re-used. For example, in my co-pending application, Ser. No. 116,833, filed June 13, 1961, I have disclosed a self-service dry cleaning system for the cleansing of textiles that embodies the use of a chloro-fluorohydrocarbon solvent as the base of a cleaning composition. The process disclosed in my aforesaid application embodies the washing of the materials with a cleaning composition that comprises the aforesaid solvent to which has been added a surface active agent, together with a small amount of moisture sufficient to form an emulsion for the removal of certain forms of soil from the textiles. Following the washing operation, the textiles are rinsed with a relatively pure solvent to remove residual soil and/or cleaning composition, and these two bodies of soiled solvent are eventually purified by distillation. The cleansed textiles are dried by the use of air within the same container in which they were washed, which air after it has picked up vapors of the solvent, is passed into one or more vessels containing an adsorbent, such as activated carbon, that serves to adsorb the vapors from the air-vapor mixture. The solvent is subsequently recovered from the adsorbent by steam distillation.

The soiled solvent resulting from the washing and rinsing of the textiles may contain a very small amount of moisture, probably from moisture in the fabrics before cleaning, but more likely being present as residual moisture combined with the surface active agent. Distillating this material, which occurs at a temperature well below the boiling point of water, causes or permits some of the moisture to be entrained with the distillate and when these vapors are passed through a more or less conventional condenser, there is still enough moisture present to cause clouding of the condensate. In recovering the solvent which has been combined with the adsorbent mass, a substantial quantity of steam is passed through the adsorbent to liberate the solvent therefrom and these vapors will ordinarily be passed through the same condenser previously mentioned to a more or less conventional liquid separator where the water, being of lighter weight than the solvent, will float on the surface of the solvent and can be decanted from the solvent. Here again, despite the fact that a hydrocarbon liquid, such as a chloro-fluorohydrocarbon is not normally soluble with water, yet a sufficient amount of moisture is combined or retained in the solvent after passing through the decanter type of separator to cloud or mist the solvent.

The presence of moisture in dry cleaning solvent is undesirable for it enters the textile fibers and causes wrinkling of the textiles as well as leaving them damp.

In the practice of the prior art of dry cleaning with organic solvents, it has been recognized that a small amount of entrained moisture may be present in the solvent within the system, and the prior practice was to utilize a cloth or rag filter which was placed in one of the solvent transfer conduits to absorb such moisture. This practice required frequent change of the cloth or rag filter, because the cloth or rag filter when saturated with water prevents continued passage of the solvent. It would be apparent therefore that this type of filter would not be applicable for use in a self-service dry cleaning system, nor would it be applicable where relatively large amounts of water coexisted with the solvent.

The prior art has also utilized a mat of glass wool as a water separator. In an application such as a self-service dry cleaning system, the use of a glass wool mat has no advantage over a cloth or rag filter. After a short period of service, materials, in the dry cleaning composition, even through distilled, forms a layer on the glass wool which impedes and eventually prevents the passage of distilled solvent through the mat.

In the present invention, I have provided a method and means by which a dry cleaning solvent which has been distilled and is mixed or combined with water as a result of distillation can be quickly and effectively separated from the water. The distillate after passing through a condenser is also passed through a substance or membrane composed of a foam-like hydrophobic material having a multiplicity of interconnected pores such as foamed polyurethane, which is located in front of or above a gravity type liquid separator. This membrane which should preferably have pores in the range of 10 to 110 pores per linear inch acts to coalesce the moisture so that when the two liquids pass to the liquid separator they are separated into distinct phases and will separate from each other by gravity.

I am of the opinion that by the use of foam-like porous material I have overcome the difficulty of the prior art by causing the minute amounts of surface active material that have passed over with the distillate to be retained by the membrane without blocking the pores thereof so that the droplets of water which have been combined with the solvent are caused to coalesce with each other and pass with the free water and the free solvent through the membrane to the water separator. This allows extended use of this type of membrane before change or replacement thereof is necessary. This is demonstrated in the following examples.

EXAMPLE I

A quantity of trichloro-trifluoroethane ($CCl_2FCClF_2$) having a boiling point of approximately 117° F., and used for the dry cleaning and rinsing of a batch of textile materials, was distilled. The soiled solvent contained various substances, here classified as "dirt," and in addition thereto it contained about 0.1% by weight of water in an emulsion of about 2% of an anionic surface active agent, consisting of an alkyl aryl sulfonate. The distillate was passed through a water cooled condenser into a gravity-type separator wherein condensed water is decanted from the top of condensed solvent. Distillation occurred, and the rate of distillation and flow of the liquid was approximately 2 gallons per minute. The distilled solvent taken from the separator contained a small amount of surface active agent and sufficient moisture to form a cloudy appearance to the solvent.

A similar experiment was made, except that in this case between the condenser and the liquid separator, and sealed in a separate chamber, was a mat composed of glass wool fibers formed with a top surface area of approximately 170 square inches, and 5 inches in depth, through which the liquid was passed. After ten operations in this manner of distillation of soiled solvent containing the anionic surface active agent, the distilled solvent taken from the separator contained a small amount of surface active agent and sufficient moisture to form cloudy solvent.

A further experiment was made, except that between the water cooled condenser and the liquid separator, and sealed in a separate chamber was a membrane composed of hydrophobic polyurethane, having approximately 80 pores per linear inch. The membrane had a top surface area of approximately 170 square inches, and the membrane was approximately 5 inches in vertical depth, through which all of the liquid was passed. Samples of the distilled solvent, repeatedly taken from the bottom of the liquid separator after many operations, contained a small amount of surface active agent but was entirely free of moisture and was clear and brilliant.

EXAMPLE II

A mass of carbon absorbent, which had received a mixture of air and trichlorotrifluoroethane, resulting from the drying of a batch of textile materials, was steam distilled and passed through the apparatus referred to in the first part of Example I. The total quantity of distillate, condensed steam and condensed solvent amounted to approximately 12 pounds, and was composed of about equal volumes of water and solvent. As the distillation commenced, the major portion of the condensed distillate was solvent with a minor portion of water, and as the distillation reached completion, the condensed distillate was composed almost entirely of water with only a minor amount of solvent. The entire body of the distillate was passed through the gravity-type separator, wherein the condensed water was decanted from the top. The condensed solvent contained sufficient moisture to form a cloudy appearance, which prevailed without noticeable separation. While some separation might have eventually occurred, none was apparent after one hour, which was more than the time limit for the intended operation.

A similar experiment was repeated using the glass wool filtering arrangement described in the second paragraph of Example I, and here again, after ten distillation operations, cloudy solvent containing moisture was obtained from the liquid separator.

The experiment was again repeated in the same manner described in the third part of Example I, using the same polyurethane membrane. The free water was separated in the usual manner, and immediately after completion of the distillation, a sample of the solvent from the decanter-type separator was examined and found to contain a small amount of surface active agent but was clear and brilliant. This condition continued to prevail after 1200 separate operations.

The principal advantage in this invention is in the provision of means for eliminating entrained moisture from dry cleaning solvents during repeated rectification or steam distillation of such solvent. This arrangement is of particular importance in connection with the dry cleaning of garments and other textile materials, and particularly in those systems which are operated by the public in self-service establishments, where the solvent is repeatedly rectified and the system is operated by persons who are generally inexperienced and have little or no control over the operation. By eliminating moisture from the dry cleaning solvent, particularly such moisture as would naturaly be absorbed by the garments or textiles, wrinkling of the garments is prevented.

The invention is defined in the terms of the appended claims.

I claim:
1. A process of purifying a used cleaning composition composed of a mixture containing a chloro-fluorohydrocarbon solvent, water and a surface active material, comprising the steps of:
   heating said mixture to a temperature above the boiling point of said solvent,
   cooling and collecting the condensate which contains solvent, moisture and an amount of surface active material sufficient to suspend said moisture in said solvent,
   passing said condensate to a membrane composed of foamed polyurethane to thereby coalesce the water phase within said membrane,
   and subsequently separating the two liquids.
2. A process according to claim 1, in which the chloro-fluorohydrocarbon is 1,1,2 - trichloro - 1,2,2 - trifluoroethane.
3. A process according to claim 1, in which the porosity of said membrane approximates 80 pores per linear inch.

References Cited

UNITED STATES PATENTS

| | | | |
|---|---|---|---|
| 3,057,676 | 10/1962 | Wedell | 8—142 |
| 3,187,895 | 6/1965 | Pall et al. | 210—315 |
| 2,961,710 | 11/1960 | Stark | 210—500 |

FOREIGN PATENTS

| | | |
|---|---|---|
| 892,663 | 3/1962 | Great Britain. |
| 858,127 | 1/1961 | Great Britain. |

MORRIS O. WOLK, *Primary Examiner.*

S. MARANTZ, *Assistant Examiner.*